(12) United States Patent
Tsurumi

(10) Patent No.: US 8,024,117 B2
(45) Date of Patent: Sep. 20, 2011

(54) MAP DISPLAY APPARATUS FOR VEHICLE

(75) Inventor: Kiyoshi Tsurumi, Obu (JP)

(73) Assignee: DENSO CORPORATION, Kariya (JP)

( * ) Notice: Subject to any disclaimer, the term of this patent is extended or adjusted under 35 U.S.C. 154(b) by 903 days.

(21) Appl. No.: 12/068,021

(22) Filed: Jan. 31, 2008

(65) Prior Publication Data

US 2008/0189035 A1 Aug. 7, 2008

(30) Foreign Application Priority Data

Feb. 1, 2007 (JP) ................................ 2007-023310

(51) Int. Cl.
*G01C 21/26* (2006.01)
(52) U.S. Cl. ................... 701/211; 340/995.25
(58) Field of Classification Search ................... 701/211
See application file for complete search history.

(56) References Cited

U.S. PATENT DOCUMENTS

| | | | | |
|---|---|---|---|---|
| 5,093,669 A | * | 3/1992 | Kajiyama | ..................... 342/457 |
| 5,638,279 A | | 6/1997 | Kishi et al. | |
| 5,732,385 A | * | 3/1998 | Nakayama et al. | ............ 701/201 |
| 6,009,374 A | * | 12/1999 | Urahashi | ....................... 701/209 |
| 6,269,304 B1 | * | 7/2001 | Kaji et al. | ...................... 701/209 |
| 2001/0007090 A1 | * | 7/2001 | Irie et al. | ....................... 701/211 |

FOREIGN PATENT DOCUMENTS

| | | |
|---|---|---|
| JP | A-H02-006713 | 1/1990 |
| JP | A-4-157312 | 5/1992 |
| JP | A-2000-275057 | 10/2000 |
| JP | A-2006-64509 | 3/2006 |

OTHER PUBLICATIONS

Office Action dated Jul. 9, 2009 in corresponding Japanese patent application No. 2007-023310 (and English translation).
Office Action dated Jan. 22, 2009 in corresponding Japanese patent application No. 2007-023310 (and English translation).
Office Action mailed Jan. 27, 2009 in corresponding Japanese patent application No. 2007-023310 (and English translation).

* cited by examiner

*Primary Examiner* — Shelley Chen
(74) *Attorney, Agent, or Firm* — Posz Law Group, PLC

(57) ABSTRACT

A remaining distance to an intersection regarded as a guide point is calculated based on map matching process. When the remaining distance is decreased to less than or equal to 100 m, an advancement display process is executed to advance a display position of a vehicle mark of the subject vehicle in the forward direction ahead of the map matched position. The vehicle mark is thus displayed, in an enlarged view of the guide point, at a position corresponding to an advanced display remaining distance, which is calculated using a predetermined formula.

7 Claims, 3 Drawing Sheets

MAP MATCHED   ENLARGED VIEW

MAP MATCHED    ENLARGED VIEW

MAP DISPLAY APPARATUS FOR VEHICLE

CROSS REFERENCE TO RELATED APPLICATION

This application is based on and incorporates herein by reference Japanese Patent Application No. 2007-23310 filed on Feb. 1, 2007.

FIELD OF THE INVENTION

The present invention relates to a map display apparatus mainly provided in a vehicle.

BACKGROUND OF THE INVENTION

A conventional navigation apparatus displays an enlarged view to illustrate a guide point such as an intersection when the vehicle approaches the guide point. In the enlarged view, the guide point is enlarged while the vehicle mark is superimposed. The driver of the vehicle recognizes from the enlarged view a positional relationship with the guide point at which the vehicle should make a right/left turn. The driver then recognizes in the real world a road state and a corresponding positional relationship with the guide point to thereby identify the guide point at which the vehicle should turn.

Such a navigation apparatus to display enlarged views for guide points is described in Patent document 1. The enlarged view for an intersection is displayed using a reduction scale, which is expanded step-by-step each time a distance with the intersection reaches a predetermined value.

Patent document 1: JP-2006-64509 A

In such a case, a time difference arises between when the driver recognizes the positional relationship with the guide point in the enlarged view and when the driver recognizes the positional relationship with the guide point in the actual road state in the real world. This results in inconsistency that the position of the vehicle recognized in the actual road state is located ahead rather than the position of the vehicle recognized in the enlarged view. The driver may mistakenly recognize that another intersection subsequently adjacent be an intersection at which the vehicle should turn left/right.

The inconsistency resulting from the time difference arises even in the navigation apparatus in Patent document 1 in which the enlarged view is step-by-step expanded as the vehicle approaches the guide point. Thus the driver's recognition precision of the guide point is required to be increased.

SUMMARY OF THE INVENTION

The present invention is made in view of the problem above. It is an object to provide a vehicular map display apparatus capable of enhancing driver's recognition precision at an intersecting point at which the vehicle should turn right or left.

To achieve the above object, according to an example of the present invention, a map display apparatus for a vehicle is provided as follows. A map memory is configured to store map data for displaying a map. A position detection device is configured to detect a present position of the vehicle. A control circuit is provided to include (i) a road estimation unit configured to estimate on the map a road, which the vehicle travels, based on the detected present position, and (ii) an on-road position calculation unit configured to calculate on the estimated road an on-road present position, which indicates a present position of the vehicle on the estimated road. A display control circuit is configured to display in a display device (i) a vehicle mark of the vehicle on the on-road present position and (ii) a map surrounding the vehicle mark. Here, the display control circuit is further provided to include an advancement display unit configured to perform an advancement display process for displaying the vehicle mark in an enlarged view such that the vehicle mark is advanced forward from the on-road present position, the enlarged view having a reduction scale greater than a predetermined reduction scale.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Figure 1:
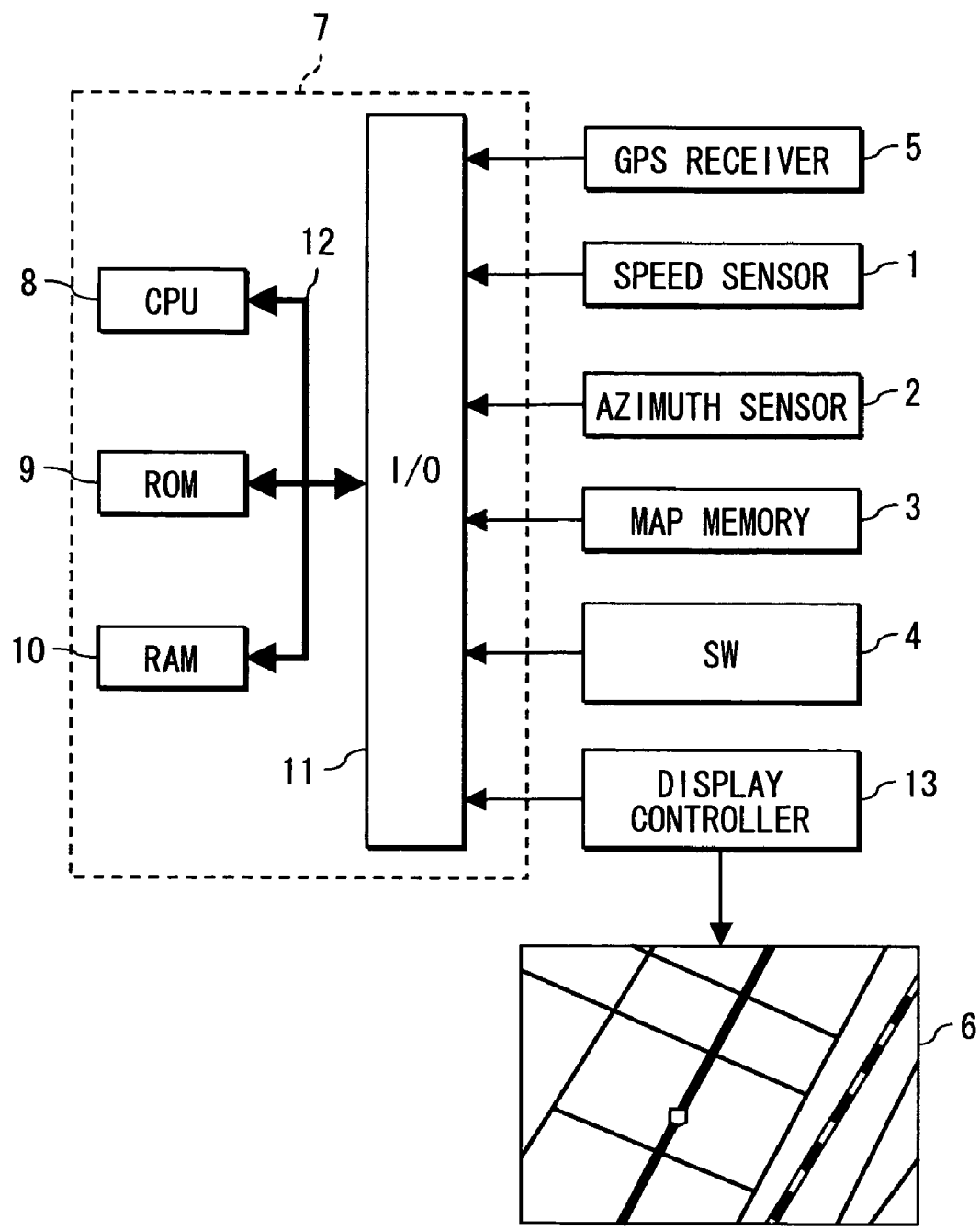
FIG. 1 is a block diagram illustrating a configuration of a navigation apparatus according to an embodiment of the present invention.

Hereafter, a vehicular map display apparatus according to an embodiment of the present invention will be explained based on the drawing. FIG. 1 is a block diagram illustrating a schematic configuration of a navigation apparatus mounted in a subject vehicle and having a function of the map display apparatus. As illustrated, the navigation apparatus includes a speed sensor 1, an azimuth sensor 2, a map memory 3, a control switch (SW) 4, a GPS (Global Positioning System) receiver 5, a display device 6, a display controller (or display control circuit) 13, and a control circuit 7 connected with the foregoing.

The control circuit 7 includes a known microcomputer having a CPU 8, a ROM 9, a RAM 10, an input output circuit 11, and a bus 12 connecting the foregoing. A program for the control circuit 7 is written in the ROM 9. Based on the program, the CPU 8 or the like executes predetermined data processing, e.g., for a route retrieval function and a route guide function. Thus, the control circuit 7 functions as a route retrieval means or unit or a route guide means or unit.

The navigation apparatus measures or detects a present position and a heading direction of the vehicle using the speed sensor 1, the azimuth sensor 2, and the GPS receiver 5. The GPS receiver receives electric waves from the satellites for detecting the present position. The GPS receiver 5 does not always measure the present position of the vehicle and output positioning information. In contrast, a self-contained navigation using the speed sensor 1 or the azimuth sensor 2 (a gyroscope may be included) provides not a little error in the obtained present position. Therefore, in the present embodiment, data on present positions of the subject vehicle (present position coordinates and heading direction of the vehicle) are measured in the hybrid manner combining the electric wave navigation based on the GPS with the self-contained navigation based on the speed sensor 1 or the azimuth sensor 2. Thus, the speed sensor 1, the azimuth sensor 2, and/or the GPS receiver 5 function as a position detection device.

The map memory 3 is a storage device to store map data containing road data, background data, and character data. A storage medium storing the map data typically includes a CD-ROM or DVD-ROM from required data volume; further, a memory card or hard disk can be alternatively substituted. Moreover, the map data can be acquired (downloaded) from an external server by communication, and then stored in an external memory etc. which are not illustrated. In such a case, the map data in the external memory can be used for various kinds of navigation functions, such as a map display for a map surrounding the subject vehicle, a map scale change for map display, or a route guide. These functions are executed when various kinds of data processing are performed mainly by the control circuit 7.

Here, an example of a configuration of the road data is explained. The road data include link IDs uniquely assigned to individual roads, link coordinate data, node coordinate data, road type data indicating road types such as expressway or national road, road width data, etc. Each road on the map is divided by multiple nodes indicating an intersecting point such as a diverging point, a merging point, or an intersection. A road section between the adjacent nodes is thereby defined as a link on the road data. The link coordinate data include coordinates of a starting end and terminating end of the link. In addition, when a node is contained in the middle of the link, the node coordinate is included in the node coordinate data. The road data is further used to provide a road shape in the map matching process or retrieve a guide route to a destination, in addition to displaying a map. Further, for the retrieval of a guide route, another road network data indicating connection relationships between roads may be prepared.

The background data associate facilities or land shapes with corresponding coordinates on the map. In addition, the facilities are associated with telephone numbers or addresses etc. which are also stored. Moreover, the character data are used to display place names, facility names, road names, etc. on the map, and associated with data of coordinates corresponding to positions for display on the map.

The control switch 4 includes a mechanical switch or a touch sensitive switch integrated with the display device 6, and is used for various inputs. For example, the navigation apparatus has a so-called route guide function to automatically retrieve an optimal route from a present position to a destination to thereby display the guide route. In such a function, the destination can be inputted via the control switch 4. The technique of automatically designating the guide route uses, for instance, the known Dijkstra method. Moreover, the navigation apparatus has a search function to retrieve a facility or the like using the above data. In such a function, the control switch 4 is used for inputting addresses, facility names, telephone numbers, etc.

The display device 6 includes, for example, a liquid crystal display. The screen of the display device 6 displays a road map surrounding the subject vehicle and a vehicle mark, which corresponds to the present position of the subject vehicle and indicates a heading direction. The road map is generated based on the map data inputted from the map memory 3. Furthermore, when the destination is designated, the guide route from the present position to the destination can be displayed in superimposition on the road map. The display information on the screen of the display device 6 is controllable by the display controller 13.

Next, a route guide process characterizing the present embodiment will be explained below. In the route guide process, while a map matching process is performed, a road map surrounding the present position of the subject vehicle and the vehicle mark are displayed to thereby allow the route guide to perform a guide to a route up to a destination.

The map matching process presumes or identify an on-map travel road, which the vehicle is presently traveling, based on data about the measured present position and heading direction of the vehicle.

For instance, based on a signal inputted from the speed sensor 1, the azimuth sensor 2, and/or the GPS receiver 5, etc., the present position and heading direction of the subject vehicle are calculated. The position information based on the GPS receiver 5 is acquired as the same coordinate data (latitude and longitude) as that of the above-mentioned road data. Moreover, the data about the heading direction and travel distance of the subject vehicle are acquired by the speed sensor 1 and the azimuth sensor 2. The coordinate data of the present position is calculated in the self-contained navigation based on the previously presumed vehicle position, which was calculated or corrected by the map matching process.

The presumed vehicle position is obtained by hybrid navigation which combines the electric wave navigation and the self-contained navigation, as mentioned above. For example, when the position information based on the GPS receiver 5 is acquired, the present position of the subject vehicle is obtained from the acquired position information. When the position information based on the GPS receiver 5 cannot be acquired, the presumed subject vehicle position is obtained from the self-contained navigation. Another method can be adopted. For instance, the presumed vehicle position is primarily obtained from the self-contained navigation which constantly allows the calculation of the present position. Further, if the presumed vehicle position can be acquired from the electric wave navigation, both the presumed vehicle positions are compared with each other. If the difference is greater than or equal to a predetermined distance, the presumed present position from the electric wave navigation is adopted.

Then, the map data of the proximity to the subject vehicle is read from the map data based on the coordinates of the presumed vehicle position, and the map matching process is then executed. In the map matching process, a road within a predetermined distance from the presumed vehicle position is extracted as a traveling candidate on-map road, which is on a map a road the vehicle may be presently traveling. Alternatively, when the presumed vehicle position is already matched on an on-map road, the on-map road is extracted as a travel candidate on-map road. The presumed vehicle position is linked with past presumed vehicle positions to thereby obtain shape data of a swept path of the subject vehicle. The shape data of the swept path is compared with the shape(s) of the travel candidate on-map road(s). The travel candidate on-map road having the highest correlation is determined (or presumed) as a travel road which the subject vehicle is presently traveling. Thus, the map matching process executed by the control circuit 7 functions as a road estimation means or unit. In addition, the calculation of the swept path or calculation of the present position and heading direction of the subject vehicle may be made only from the position data of the GPS receiver 5, or only from the position data from the self-contained navigation. As the travel road of the subject vehicle is thus determined, a present position on the travel road (i.e., map-matched position or on-road position) is then obtained. Thus, the map matching process executed by the control circuit 7 functions as an on-road position calculation means or unit.

When a route guide is started in the route guide process, an enlarged view is displayed to conduct a guide indicating a heading direction at a guide point when the subject vehicle approaches the guide point. For instance, the guide point is a point at which a travel road of the subject vehicle merges or diverges, or an intersection at which the vehicle should make a left or right turn. For example, when the vehicle approaches an intersection at which the vehicle should turn to the right, an enlarged view for the intersection (illustrated in FIG. 2) and a road map surrounding the vehicle are displayed side by side.

In the intersection enlarged view, the vehicle mark is displayed on the map matched position obtained based on the above map matching process. Further, in the present embodiment, when a remaining distance from the map matched position to the nearest intersection, at which the vehicle should turn right, is decreased to a predetermined distance (e.g., 100 m in FIG. 2), an advancement display process is started by the display controller 13 to move forward the vehicle mark ahead of the map matched position and display the forward moved vehicle mark. Thus, the advancement display process executed by the display controller 13 functions as an advancement display means or unit.

Figure 2:
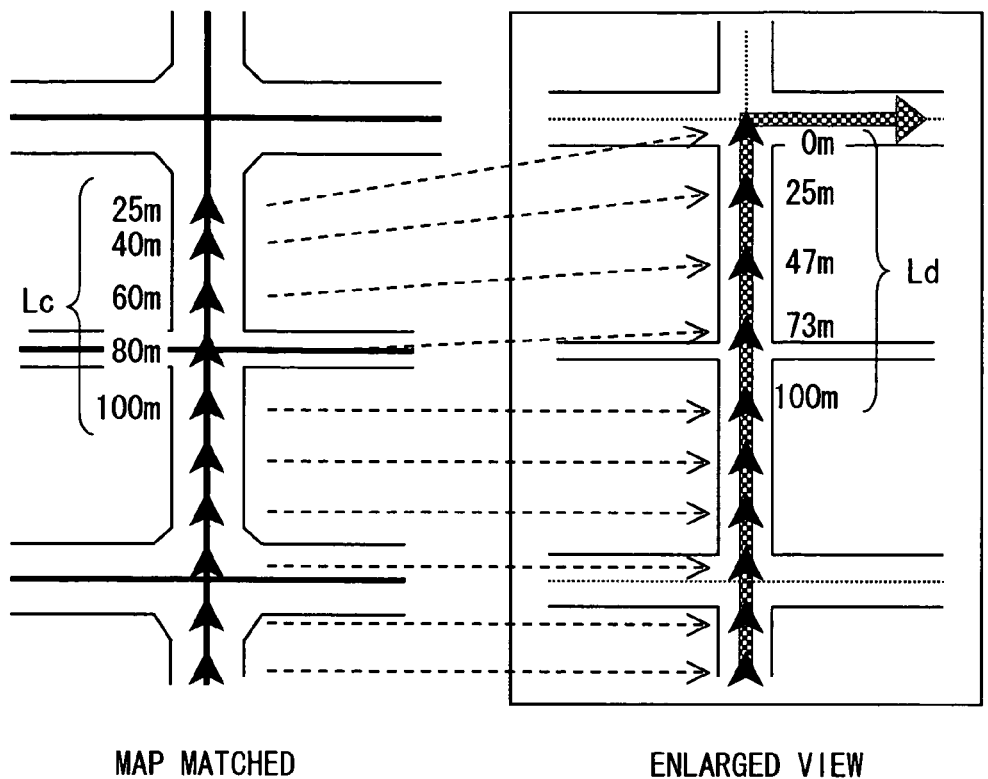
FIG. 2 is a view contrasting map matched positions with display positions of vehicle marks in an intersection enlarged view.

That is, as shown in FIG. 2, when the remaining distance to (the center of) the intersection at which the vehicle should turn right from the map matched position is greater than 100 m, the display position of the vehicle mark used for the intersection enlarged view is equal to the map matched position. When the remaining distance is less than or equal to 100 m, the display position of the vehicle mark is displayed as being advanced (i.e., moved forward) ahead of the map matched position. For instance, a remaining distance Lc is defined as a distance between the intersection and the map matched position; a display remaining distance is defined as a distance between the intersection and the display position of the vehicle mark used for the intersection enlarged view. Naturally, on the screen of the display device 6, those distances are reduced according to a corresponding reduction scale and displayed. When the remaining distance Lc is 80 m, the display remaining distance Ld is set to 73 m. Further, when Lc=25 m, Ld=47 m. When Lc=40 m, Ld=25 m. When Lc=25 m, Ld=0 m.

Figure 3:
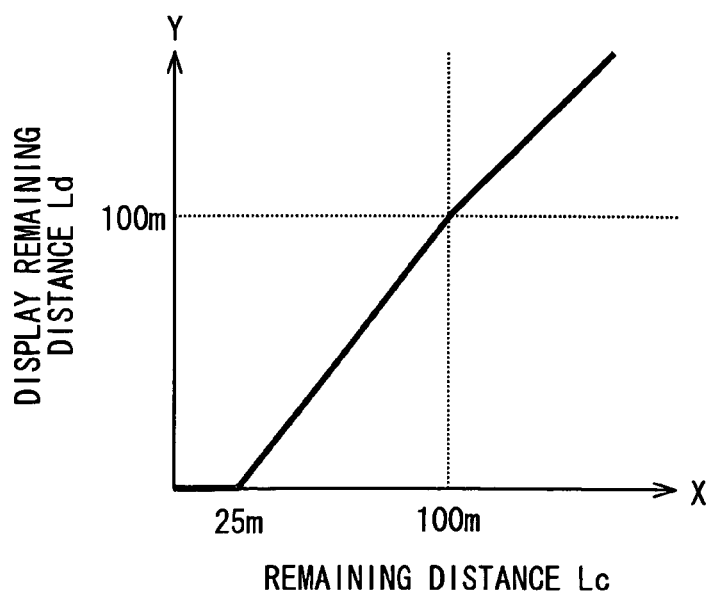
FIG. 3 is a diagram illustrating a relationship between a map matched remaining distance Lc and an advanced display remaining distance Ld.

FIG. 3 illustrates a relationship between (i) the remaining distance Lc from the intersection to the map matched position (in X axis) and (ii) the display remaining distance Lc from the intersection to the display position of the vehicle mark (in Y axis). The relationship illustrated in FIG. 3 is expressed in formula 1 as follows.

$Ld=Lc \ldots (Lc>100 \text{ m})$ $Ld=(4 \times Lc-100)/3 \ldots (25 \text{ m}<Lc\leq 100 \text{ m})$ $Ld=0 \ldots (Lc\leq 25 \text{ m})$ (Formula 1)

As shown in FIG. 3, when and after the display remaining distance Ld reaches 0 m, the display remaining distance Ld remains at 0 m until the remaining distance Lc is decreased to 0 m. Thus the vehicle mark is caused to be stopping at the intersection or guide point until the remaining distance Lc is decreased to 0 m.

The driver can thus easily recognize the guide point.

Thus, in the intersection enlarged view of the route guide process according to the present embodiment, when the remaining distance Lc is less than or equal to 100 m, an advancement display process is performed to display the vehicle mark on the position, which is located in the display remaining distance Ld from the corresponding intersection. The display remaining distance Ld is calculated using formula 1. When the vehicle approaches a guide point, the advancement display process is thus caused to start. Starting of the advancement display process can reduce the degree of the inconsistency in the vehicle position resulting from the time difference.

A process for calculating a display position (display position calculation process), which is executed mainly by the display controller 13, will be explained below with reference to FIG. 4. The display position calculation process calculates a display position of the vehicle mark in the advancement display process. Further, formula 1 illustrates an example in the advancement display process. Another example is explained which uses a general formula 2. In formula 2, a parameter L1 is previously defined as an advancement start distance between a guide point and a point at which the advancement of the vehicle mark is started; $\alpha$ is previously defined as a ratio ($0<\alpha<1.0$) of the advancement.

$Ld=Lc \ldots (Lc>L1)$ $Ld=Lc-\{(L1-Lc) \times \alpha/100\} \ldots ([\alpha \times L1/(100+\alpha)]<Lc\leq L1)$ $Ld=0 \ldots (Lc\leq [\alpha \times L1/(100+\alpha)])$ (Formula 2)

Figure 4:
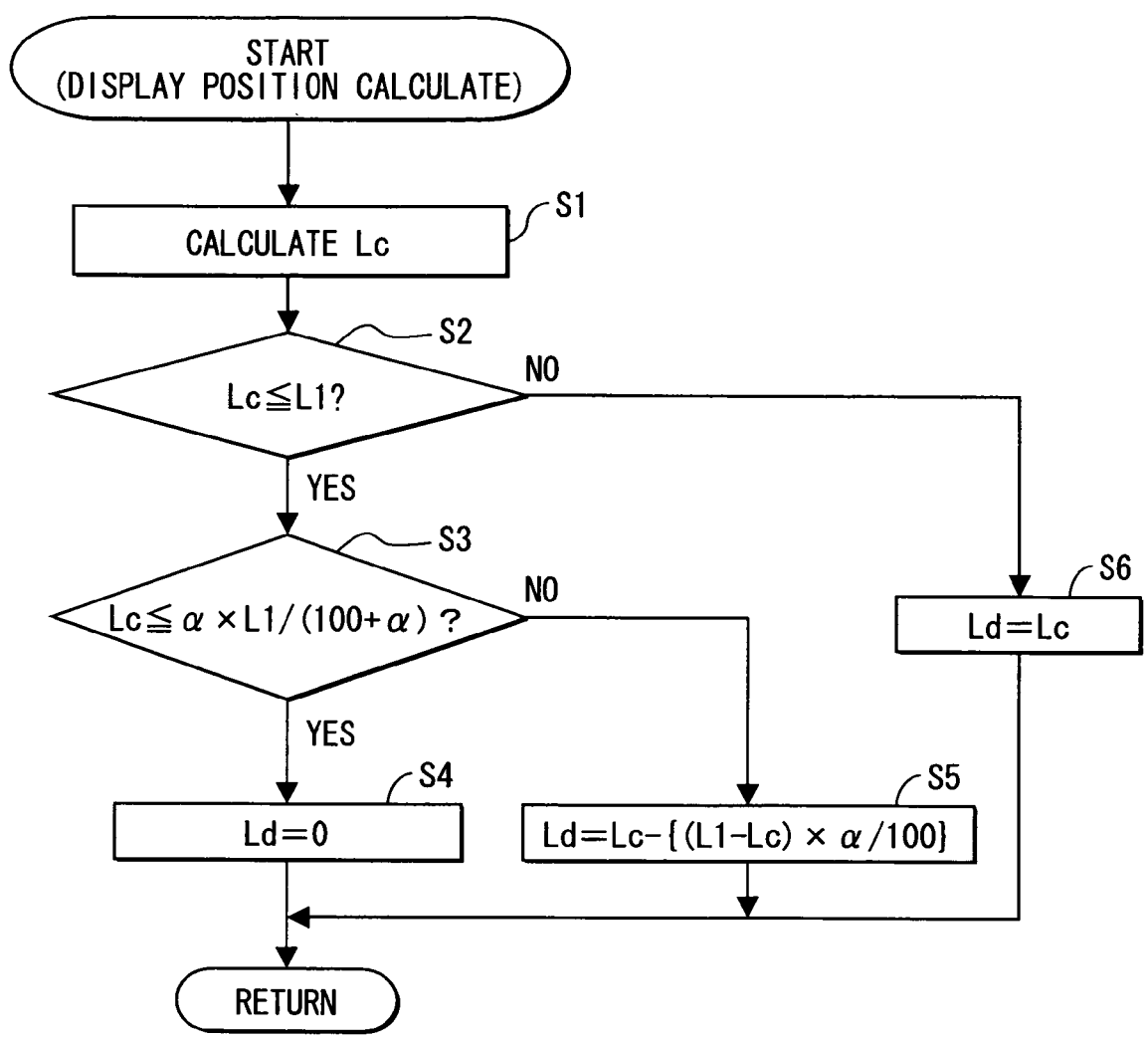
FIG. 4 is a flowchart explaining a process for calculating a display position of the vehicle mark.

The process in FIG. 4 is repeatedly executed every fixed time period. First, at Step S1, a remaining distance Lc from the map matched position to the guide point (center of the guide point) is calculated. At Step S2, it is determined whether the remaining distance Lc is less than the advancement start distance L1. Thus, the determination at Step S2 executed by the display controller 13 functions as a remaining distance determination means or unit. Here, when the determination is affirmed, processing proceeds to Step S3. When negated, no advancement is executed; processing proceeds to Step S6. At Step S6, the display remaining distance Ld is regarded as being equal to the remaining distance Lc(Ld=Lc). The process then ends.

At Step S3, it is determined whether the remaining distance Lc is a distance causing Ld≤0, i.e., Lc≤{$\alpha \times L1/(100+\alpha)$}. When the determination is affirmed, it is determined that the vehicle mark arrives at the guide point. Processing then proceeds to Step S4, where Ld=0 is set. The present process is then ended. In contrast, when the determination is negated, processing proceeds to Step S5, where the display remaining distance Ld is calculated from formula 2. The present process is then ended.

As explained above, in an intersection enlarged view of the route guide process of the navigation apparatus according to the present embodiment, a remaining distance Lc is less than or equal to L1, an advancement display process is started to advance a vehicle mark in the heading direction ahead of the map matched position and display the advanced vehicle mark.

For instance, after a driver recognizes the positional relationship between the vehicle mark and the intersection at which the vehicle should make a right/left turn, the driver recognizes the positional relationship between the actual road state and the subject vehicle. Even in such a case, inconsistency due to the resulting time difference can be eliminated by executing an advancement display process. In other words, the advancement display process is executed to anticipate the inconsistency in the vehicle position resulting from the time difference, and adjust the vehicle mark to the actual vehicle position. The driver's recognition precision of the intersection can be thereby enhanced.

The preferred embodiment of the present invention is thus described; however, without being restricted to the embodiment mentioned above, the present invention can be variously modified as long as not deviating from the scope thereof.

For example, the ratio $\alpha$ of the advancement is set constant in the present embodiment. The speed of the vehicle varies a travel distance the vehicle travels during the time difference;

namely, the speed varies a degree of inconsistency in the vehicle position. Therefore, the ratio a of the advancement may be varied by the display controller 13 based on the speed of the vehicle. This can decrease the degree of the inconsistency in the vehicle position regardless of variation in the speed of the subject vehicle. Thus, the display controller 13 functions as an advancement ratio change means or unit.

Each or any combination of processes, steps, or means explained in the above can be achieved as a software unit (e.g., subroutine) and/or a hardware unit (e.g., circuit or integrated circuit), including or not including a function of a related device; furthermore, the hardware unit can be constructed inside of a microcomputer.

Furthermore, the software unit or any combinations of multiple software units can be included in a software program, which can be contained in a computer-readable storage media or can be downloaded and installed in a computer via a communications network.

(Aspects of Disclosure)

Aspects of the disclosure described herein are set out in the following clauses.

As an aspect of the disclosure, a map display apparatus for a vehicle is provided as follows. A map memory is configured to store map data for displaying a map. A position detection device is configured to detect a present position of the vehicle. A control circuit is provided to include (i) a road estimation unit configured to estimate on the map a road, which the vehicle travels, based on the detected present position, and (ii) an on-road position calculation unit configured to calculate on the estimated road an on-road present position, which indicates a present position of the vehicle on the estimated road. A display control circuit is configured to display in a display device (i) a vehicle mark of the vehicle on the on-road present position and (ii) a map surrounding the vehicle mark. Here, the display control circuit is further provided to include an advancement display unit configured to perform an advancement display process for displaying the vehicle mark in an enlarged view such that the vehicle mark is advanced forward from the on-road present position, the enlarged view having a reduction scale greater than a predetermined reduction scale.

The driver may recognize a positional relationship with a guide point in the enlarged view and, then, recognize in the real world a road state and a corresponding positional relationship with the guide point to thereby identify the guide point at which the vehicle should turn. Even in such a case, executing the advancement display process can decrease the degree of the inconsistency resulting from the time difference. In other words, the advancement display process is executed to anticipate the inconsistency in the vehicle position resulting from the time difference, and adjust the vehicle mark to correspond to the actual vehicle position. The driver's recognition precision of the intersection can be thereby enhanced.

As an optional aspect, the display control circuit may further include a remaining distance determination unit configured to execute a determination as to whether a remaining distance from the on-road present position to an intersecting point ahead of the vehicle is decreased to less than or equal to a predetermined distance. The advancement display unit may be configured to perform the advancement display process when the determination is affirmed.

Thus, for instance, when the vehicle approaches an intersecting point at which the vehicle may turn, diverge from the travel road or merge to another road, the advancement display process can be started. This helps prevent occurrence of the inconsistency in the vehicle position after the advancement display process starts.

As an optional aspect, the control circuit may include (i) a route retrieval unit configured to retrieve a route to a destination and (ii) a route guide unit configured to perform a guide to the retrieved route while displaying the retrieved route in the display device. The intersecting point may be a guide point at which the route guide unit performs a guide to a heading direction of the vehicle.

This is because the above mentioned time difference typically arises in the guide point at which a guide is performed by the route guide unit. When the vehicle approaches the guide point, an enlarged view may be displayed for the guide point. Thus, as an optional aspect, the advancement display unit may be configured to execute the advancement display process when the guide point is displayed in the enlarged view.

As an optional aspect, as the remaining distance to the guide point decreases, the vehicle mark may be advanced more forward from the on-road present position and is displayed.

As an optional aspect, when the vehicle mark reaches the intersecting point while the advancement display process is executed, the advancement display unit may stop the vehicle mark at the intersecting point until the on-road present position reaches the intersecting point. The driver can thus easily recognize the guide point.

As an optional aspect, the display control circuit may further include an advancement ratio change unit configured to change, based on a speed of the vehicle, a ratio of an advancement used for displaying the vehicle mark ahead of the on-road present position.

The degree of the inconsistency due to the time difference in the vehicle position, i.e., a travel distance during the time difference, varies depending on a speed of the vehicle. The inconsistency in the vehicle position can be restricted by changing an advancement ratio depending on the speed of the vehicle.

As an optional aspect, the intersecting point may include at least one of a diverging point, a merging point, and an intersection.

It will be obvious to those skilled in the art that various changes may be made in the above-described embodiments of the present invention. However, the scope of the present invention should be determined by the following claims.

What is claimed is:

1. A map display apparatus for a vehicle, the apparatus comprising:
   a map memory that stores map data for displaying a map;
   means for measuring a present position of a subject vehicle;
   means for performing a road estimation process to estimate in the map a road that the subject vehicle is traveling based on a present position of the subject vehicle measured by the measuring means;
   means for acquiring an on-road vehicle position that indicates a present position of the subject vehicle on the road estimated by the road estimation process performing means; and
   a display control circuit that displays in a display device a subject vehicle mark and a map surrounding the subject vehicle mark such that the subject vehicle mark is displayed on the on-road vehicle position,
   the display control circuit comprising:
   means for executing an advancement display process when a displayed map that is displayed in the display device is an enlarged map having a reduction scale greater than a predetermined reduction scale, the advancement display process displaying the subject vehicle mark on the displayed map in between the on-road vehicle position and a point that is at least one of a diverging point, a merging point, and an intersection, the point being from the on-road vehicle position a nearest point at which the subject vehicle is to turn right or left, diverge, or merge forward of the on-road vehicle position in a heading direction.

2. The map display apparatus according to claim 1, wherein the advancement display process executing means increases a length by which a display position of the subject vehicle mark is advanced as a distance up to the point decreases, the point that is at least one of the diverging point, the merging point, and the intersection, the point being from the on-road vehicle position the nearest point at which the subject vehicle is to turn right or left, diverge, or merge forward of the on-road vehicle position in the heading direction.

3. The map display apparatus according to claim 1, further comprising:

means for determining whether a remaining distance up to the point is equal to or less than a predetermined distance, the point that is at least one of the diverging point, the merging point, and the intersection, the point being from the on-road vehicle position the nearest point at which the subject vehicle is to turn right or left, diverge, or merge forward of the on-road vehicle position in the heading direction, wherein the advancement display process executing means executes the advancement display process when it is determined that the remaining distance becomes equal to or less than the predetermined distance.

4. The map display apparatus according to claim 3, further comprising:

means for retrieving a route to a destination; and means for performing a guide of the route retrieved by the retrieving means while displaying the retrieved route in the display device, wherein a target point for a remaining distance in the determining by the determining means is a guide point at which the guide performing means performs a guide towards the heading direction of the subject vehicle, the guide point being at least one of a diverging point, a merging point, and an intersection on the route.

5. The map display apparatus according to claim 4, wherein the advancement display process executing means executes the advancement display process when an enlarged map of the guide point is displayed.

6. The map display apparatus according to claim 3, wherein when the subject vehicle mark reaches the point being at least one of the diverging point, the merging point, and the intersection while the advancement display process is being executed, the advancement display process executing means stops the subject vehicle mark at the point until the on-road vehicle position reaches the point being at least one of the diverging point, the merging point, and the intersection.

7. The map display apparatus according to claim 1, wherein the display control circuit further comprises means for changing, based on a speed of the subject vehicle, a ratio of an advancement used for displaying the subject vehicle mark forward of the on-road vehicle position in a heading direction.

* * * * *